No. 639,540. Patented Dec. 19, 1899.
W. DUNCAN.
MEANS FOR MIXING AND AERATING SANDS OR TAILINGS WHILE UNDER TREATMENT BY SOLVENTS.
(Application filed June 27, 1899.)
(No Model.) 2 Sheets—Sheet 1.
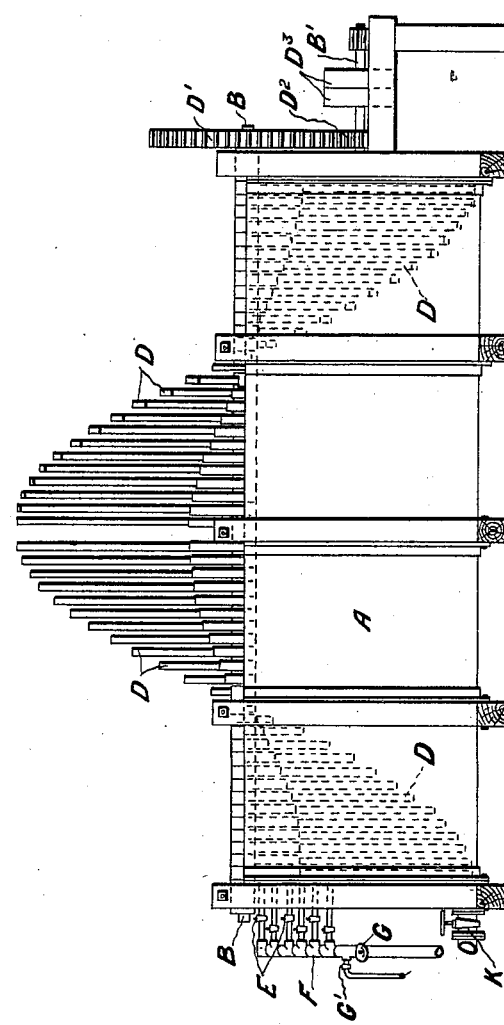
FIG. I.
WITNESSES:
Ella L. Giles.
INVENTOR
William Duncan
BY
Richardson
ATTORNEYS No. 639,540. Patented Dec. 19, 1899.
W. DUNCAN.
MEANS FOR MIXING AND AERATING SANDS OF TAILINGS WHILE UNDER TREATMENT BY SOLVENTS.
(Application filed June 27, 1899.)
(No Model.) 2 Sheets—Sheet 2.
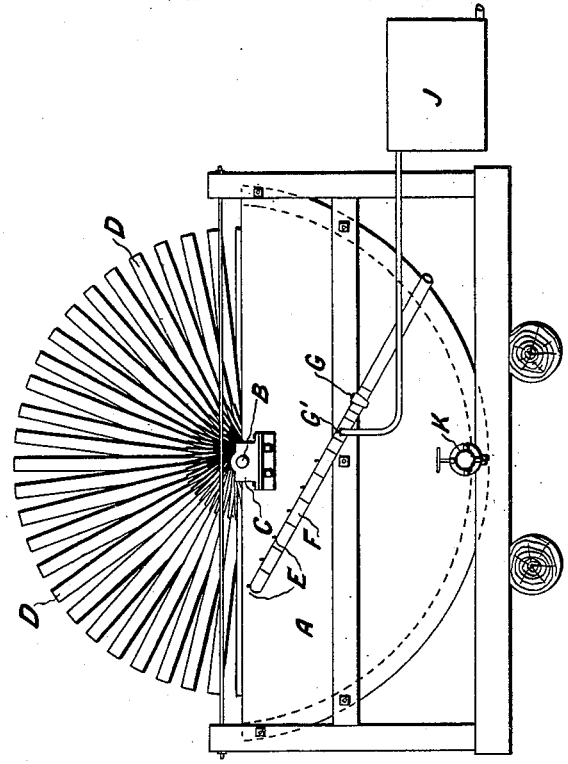
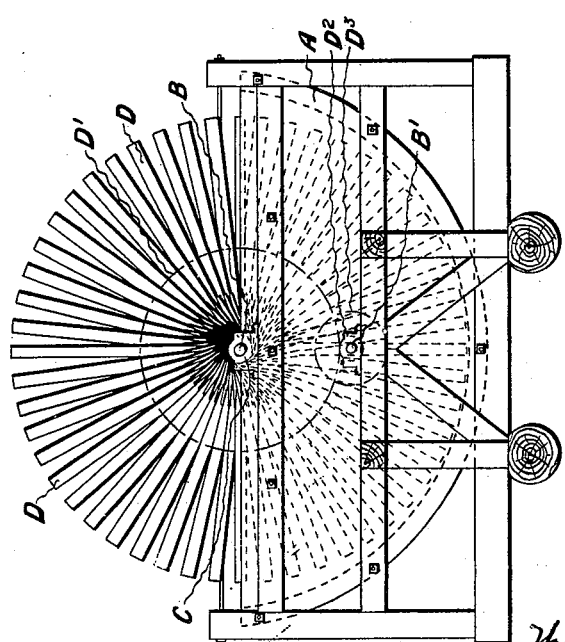
WITNESSES:
INVENTOR
William Duncan
BY
ATTORNEYS.

UNITED STATES PATENT OFFICE.

WILLIAM DUNCAN, OF DAY DAWN RIDGE, CHARTERS TOWERS, QUEENSLAND.

MEANS FOR MIXING AND AERATING SANDS OR TAILINGS WHILE UNDER TREATMENT BY SOLVENTS.

SPECIFICATION forming part of Letters Patent No. 639,540, dated December 19, 1899.

Application filed June 27, 1899. Serial No. 722,095. (No model.)

*To all whom it may concern:*

Be it known that I, WILLIAM DUNCAN, engineer, residing at Day Dawn Ridge, Charters Towers, Queensland, have invented certain new and useful Improvements in Means for Mixing and Aerating Sands or Tailings While under Treatment by Solvents; and I do hereby declare the following to be a full, clear, and exact description of the invention, such as will enable others skilled in the art to which it appertains to make and use the same.

Numerous attempts have from time to time been made to secure the thorough mixing of sands and tailings, including slimes, with the solvent while under treatment and also to prevent that close packing which prevents the percolation of the solvent and wash liquors. For this purpose vertical vessels with vertical agitators, revolving barrels, and air, steam, and water jets have been used; but these means have not been as efficient as they might be.

My invention relates to improved mechanical means for mixing and aerating "sands" or "tailings," by which terms I include slimes, sludges, and concentrates, while under the action of solvents, whereby time is saved and a better extraction is obtained; and it consists of a semicircular vat provided with a revoluble agitator composed of arms arranged helically on a shaft running the length of the vat. At one end of the vat is placed the fast and loose pulleys and gear for slowly rotating the agitator, while at the opposite end a series of taps are provided connected to the vat at various heights and to pipes, so that the liquor can be drawn off at any desired point and either run direct to the sump or through a filter to the sump.

In order that my invention may be clearly understood, I will now describe it with the aid of the accompanying drawings, of which—

Figure 1 represents a side elevation of the plant. Fig. 2 is one end elevation of the same. Fig. 3 is a view of the opposite end, showing decanting-cocks.

A is the vat, made, preferably, of iron or steel, semicircular in section and of any convenient length. It is carried in a framework of wood, which framework is extended to carry the driving-gear.

Over the top of the vat A is a shaft B, (having its center somewhat below the center of the vat,) carrying wooden arms in metal sockets arranged helically on said shaft. The shaft B is carried in bearings C and has on one end the spur-wheel D', into which gears the pinion D² on the counter-shaft B'. This shaft B' also carries the belt-pulleys D³.

At the ends of the vat opposite to the gearing I arrange on a diagonal line a number of taps E, (see Fig. 1,) secured to the end plate and connected to a common discharge-pipe F, which leads direct to the sump; but by shutting the tap G and opening the tap G' the liquors may be diverted through a filter J, and thence onto the sump.

The sluice K is fitted for discharging the contents of the vat after treatment by the addition of water.

Although this invention is designed, primarily, for the treatment of slimes and sludges, it will be understood that it is useful as a most efficient washer and puddler and can also be used for treating alluvial. For the latter purpose the vat would be divided into compartments, so that the material could pass from one to the other, and thus permit of continuous treatment.

When working on slimes or sludges, the following is the most definite instructions of the best method to proceed; but it is obvious that the hereinafter-described treatment must be varied to suit the material under treatment: The solution is first put into the vat and then the agitator set in motion at the rate of five to twelve revolutions per minute, and while in motion the material to be treated is shoveled into the vat in an unscreened condition, the lumps being broken up by the agitator and liquor, and the whole becomes thoroughly intermixed with the solution. After the full charge of solids has been shoveled in the agitator is kept at work for such time as is necessary for the solvent to act and eventually stopped to allow the contents to settle. The clear liquor is drawn off through the taps E and pipes connected therewith. A weak wash or, if preferred, a water wash is added and the agitator revolved again for a short time. The contents are allowed to settle, the clear liquor being again drawn off, and this operation repeated until the solvent and its contents are washed out completely. To empty the vat after the last wash has been drained off, water is added, the agitator set in motion, and the sluice K opened, so that water and slimes are discharged together, the shaft being kept in motion until all is discharged. The gold in the solution is then recovered by any of the well-known means.

The bottom of the vat may be perforated and provided with an outer case, so that the contents may in some cases be leached, as in an ordinary vat, after agitation.

What I claim as my invention, and desire to secure by Letters Patent, is—

The herein-described improved means for mixing and aerating sands, tailings, and the like, comprising a semicircular vat, a horizontal rotatable shaft journaled therein, arms helically arranged on said shaft, said arms depending into close proximity to the bottom, a plurality of outlets arranged at varying levels and uniting in a common pipe leading to the sump, a cock in said pipe and an independent pipe leading from said discharge-pipe to a filter and having a cock and a discharge-sluice for draining said vat, substantially as described.

In testimony that I claim the foregoing as my invention I have signed my name in presence of two subscribing witnesses.

WILLIAM DUNCAN.

Witnesses:
A. S. GROSE,
GEO. H. BRITTAIN.